UNITED STATES PATENT OFFICE.

FELIX O. ANDRES, OF SAN FRANCISCO, CALIFORNIA.

PROCESS OF COATING WITH PRECIOUS METAL.

1,281,262.  Specification of Letters Patent.  Patented Oct. 15, 1918.

No Drawing.   Application filed September 21, 1915. Serial No. 51,789.

*To all whom it may concern:*

Be it known that I, FELIX O. ANDRES, a citizen of the United States, residing at the city and county of San Francisco and State of California, have invented certain new and useful Improvements in Processes of Coating with Precious Metal, of which the following is a specification.

The present invention relates to improvements in the art of applying gold or like metal to glass surfaces, such as display signs or the like, and the invention has for its principal objects to dispense with the necessity of applying the gold in leaf form and by the aid of a brush, which is the present process, and by so doing reducing the cost of manufacture of the coated article and increasing the output of the establishments for this purpose; to provide a method whereby the coating is applied in a liquid form and in an even, unbroken film or surface of uniform color, thereby overcoming the joint lines and patches which are present when the leaf is applied by the present brush process, and overcoming the objection of the coating or film being in various colors due to the different shades of the respective leaves applied; and to provide a method whereby the coating after being applied may be toned or darkened, if desired.

In employing my improved process, the surface of the glass to be coated or to receive the thin film or deposit of metal is first chemically cleaned to insure the removal of any foreign substances therefrom, and is thence subjected to a coating or a solution of ninety grains of muriate of tin dissolved in a gallon of water which is poured thereover, and after being allowed to stand a short time is rinsed off, leaving a portion of the tin solution which forms a metallic deposit to which the gold will adhere. I then prepare three solutions, and for clearness of description will number the same solutions, one, two and three. Solution number one comprises one ounce of chlorid of gold dissolved in a gallon of water, and solution number two consists of one and one-half ounces of an alkali preferably potassium carbonate dissolved in a gallon of water, and to which solution is added two fluid ounces of solution number one. Solution number three is formed by dissolving thirty-five grains of sugar, preferably grape sugar, in two gallons of water. With the solutions thus prepared, I take a one-half fluid ounce of solution number one, one ounce of solution number two and four ounces of solution number three and thoroughly mix the same in any well known manner, and then after the glass has been placed level, the mixture of the three solutions is poured over the surface thereof, which has been previously treated with the muriate of tin solution, and is allowed to stand a sufficient time to permit the depositing and fixing of the gold or film coating on the surface thereof, and after which time the excess solution is poured off. Should it be desired, a number of applications of a mixture of the three solutions may be applied, until a deposit of the desired thickness is obtained.

The deposit is now backed or coated with a film of silver solution of the well known type now universally in use for this purpose, and which is applied in the well known manner, and which affords a protection for the gold deposit and insures the lasting thereof.

Should it be desired to tone or darken the deposit, the silver solution applied thereto is first produced in the following manner. To one ounce of said silver solution there is added eight ounces of water, and then fifteen drops of a solution of nitrate of copper, which has been prepared by mixing thirty grains of copper nitrate in sixteen ounces of water. The solution of the copper and the silver thus formed when applied to the gold deposit or film will, owing to the gold deposit being translucent, permeate the gold deposit and provide a dark backing or body for the same.

It is apparent that the gold deposit as applied to the surface by flowing the same thereon dispenses with the slow and expensive method now universally in use and by the mixture of the component parts of the solution, the same dries in a hard deposit or film which readily adheres to the surface coated and thus dispenses with the heating or electro-plating process which is employed for this purpose. By employing the solution components of my present formula, I am enabled to quickly cover a considerable surface of glass with a thin film at little cost and thereby reduce the cost of manufacture of metal coated articles of the type above set forth.

I claim:—

1. The method of gold plating a transparent article, the steps of which comprise in applying to the surface to be treated a body to which gold will adhere, then applying by flowing thereover and without the application of heat, a solution containing chlorid of gold, potassium carbonate and sugar, permitting the gold to settle in a film coating on the treated surface, removing the excess of the solution by permitting the same to flow therefrom on the tipping of the article and then applying to the film of gold a toning backing of silver solution having nitrate of copper intermixed therewith.

2. The method of gold plating the surface of a transparent article, the steps of which comprise in treating the surface thereof to free the same of foreign substance, then applying to the surface a metallic deposit to which gold will adhere, applying to said base by pouring thereover and without the application of heat either to the article or to the solution an alkaline solution containing chlorid of gold, permitting the gold to deposit thereover as a film coating, removing the excess of the solution by tipping the article to permit the same to flow therefrom, then toning the color of the said film coating by applying thereto a solution containing nitrate of copper.

In testimony whereof I have signed my name to this specification in the presence of two subscribing witnesses.

FELIX O. ANDRES.

Witnesses:
HARRY A. TOTTEN,
D. B. RICHARDS.

DISCLAIMER 1,281,262.—*Felix O. Andres*, San Francisco, Calif. PROCESS OF COATING WITH PRECIOUS METAL. Patent dated October 15, 1918. Disclaimer filed May 23, 1930, by the patentee.

Hereby enters this disclaimer of so much of claims 1 and 2 of said specification as is in excess of the following:

1. The method of gold plating a transparent article, the steps of which comprise in applying to the surface to be treated a body to which gold will adhere, then applying by flowing thereover and without the application of heat, a solution containing chlorid of gold, potassium carbonate and sugar diluted as a substance effective to control or regulate the chemical reactions, permitting the gold to settle in a film coating on the treated surface, removing the excess of the solution by permitting the same to flow therefrom on the tipping of the article and then applying to the film of gold a protective toning backing of silver solution having nitrate of copper intermixed therewith.

2. The method of gold plating the surface of a transparent article, the steps of which comprise in treating the surface thereof to free the same of foreign substance, then applying to the surface a metallic deposit to which gold will adhere, applying to said base by pouring thereover and without the application of heat either to the article or to the solution an alkaline solution sufficiently diluted to control or regulate the chemical reaction with chlorid of gold, permitting the gold to deposit thereover as a film coating, removing the excess of the solution by tipping the article to permit the same to flow therefrom, then toning the color of said film coating by applying thereto a solution containing nitrate of copper.

[*Official Gazette June 10, 1930.*]